C. S. SHARP.
DISK HARROW.
APPLICATION FILED AUG. 1, 1912.
1,221,230. Patented Apr. 3, 1917.
5 SHEETS—SHEET 1.
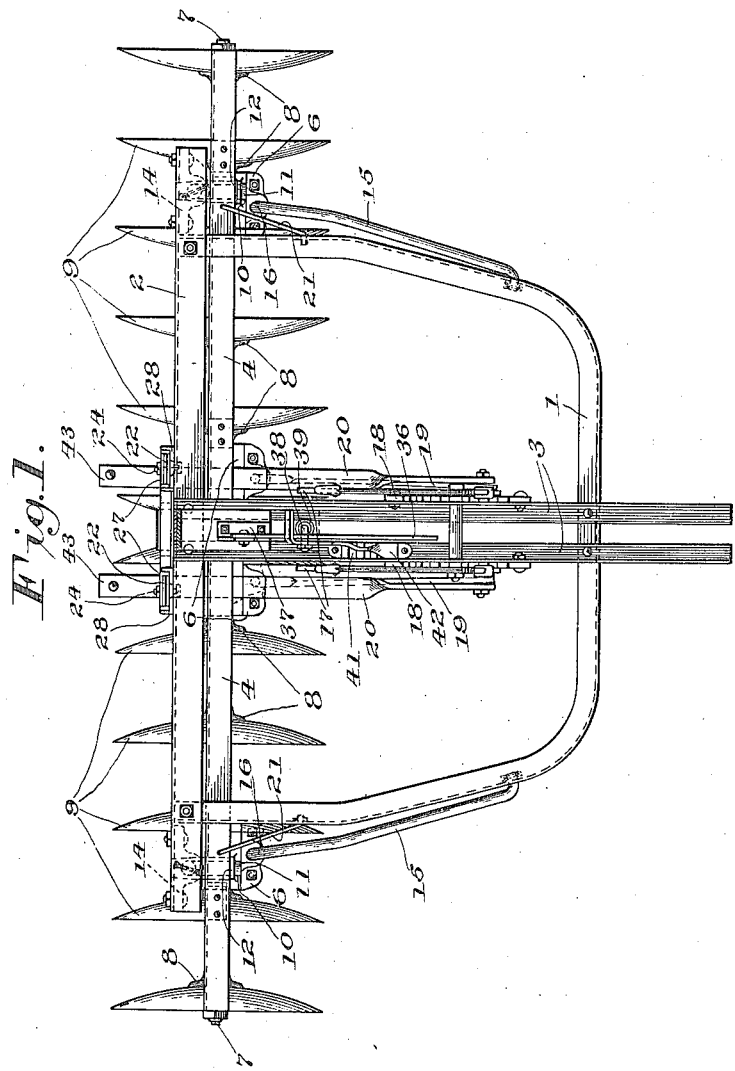
WITNESSES.
C. C. Palmer.
F. W. Hofmeister.
INVENTOR.
Charles S. Sharp,
BY E. W. Burgess
ATTORNEY.

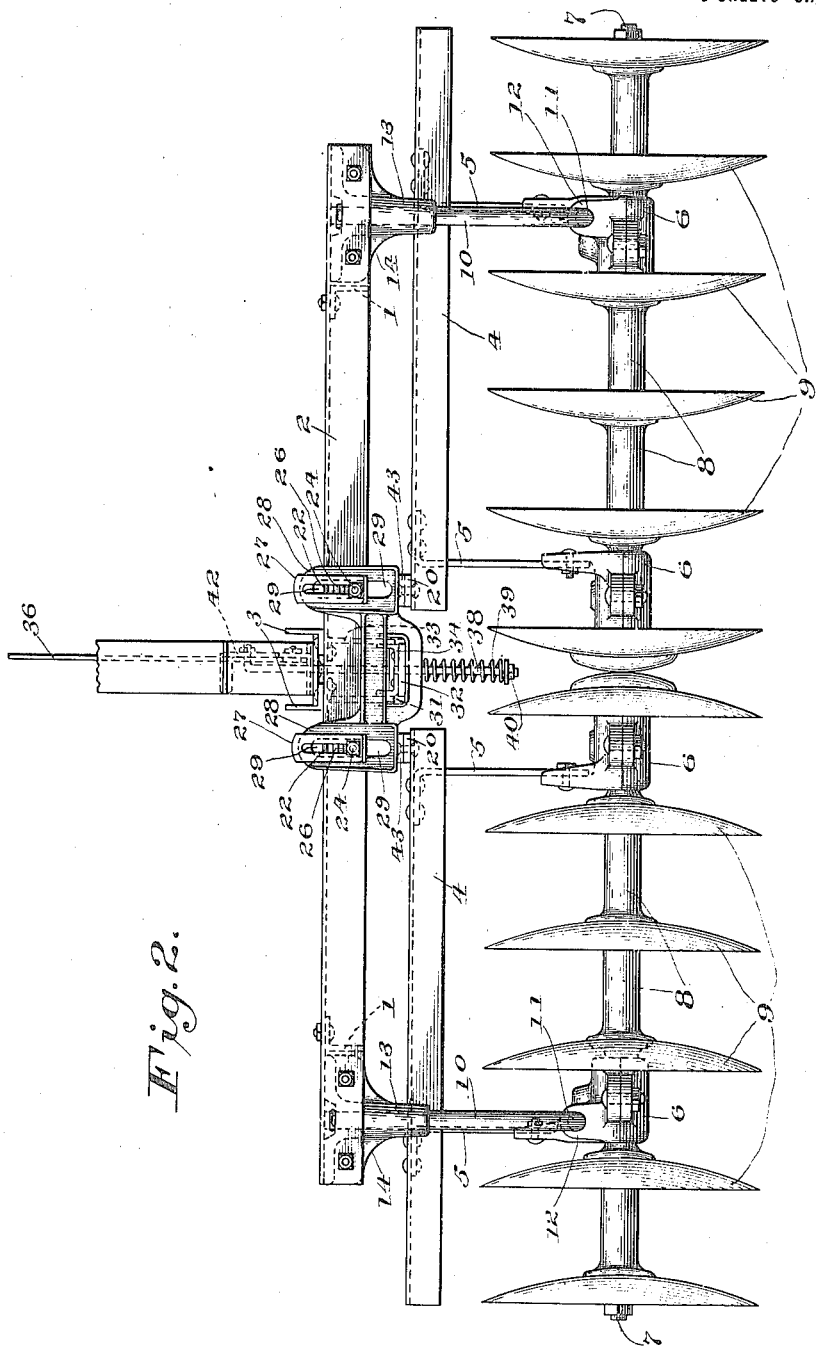

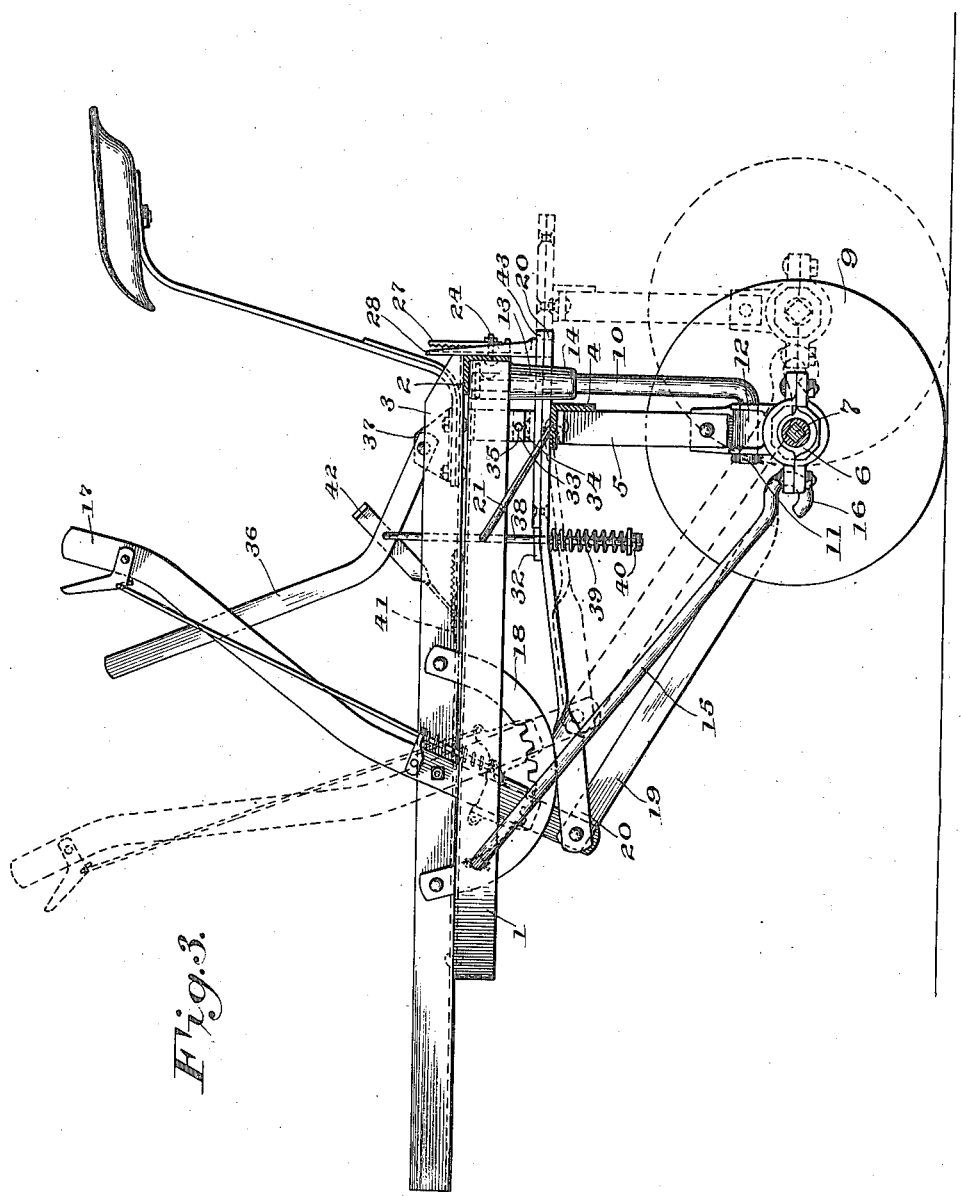

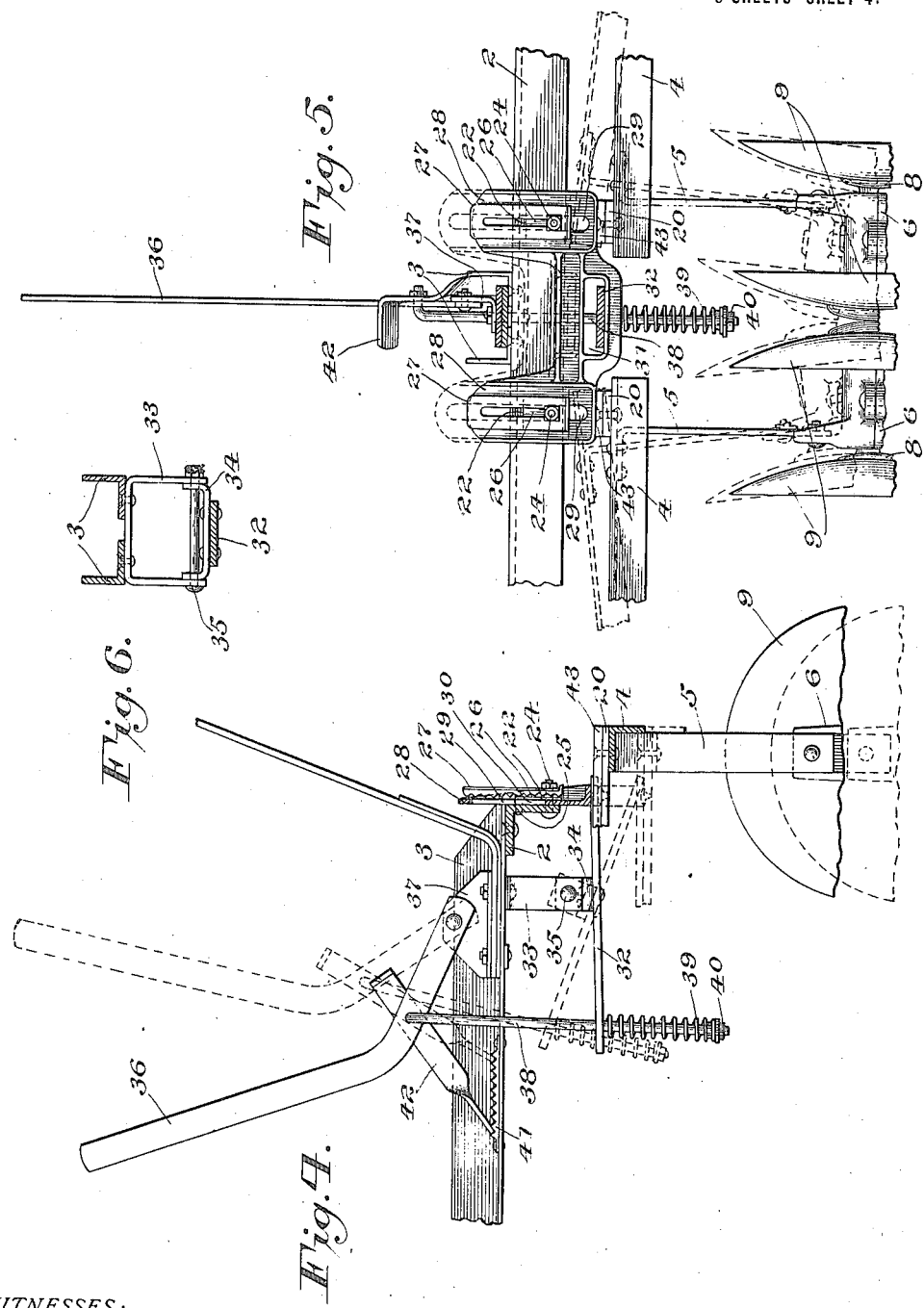

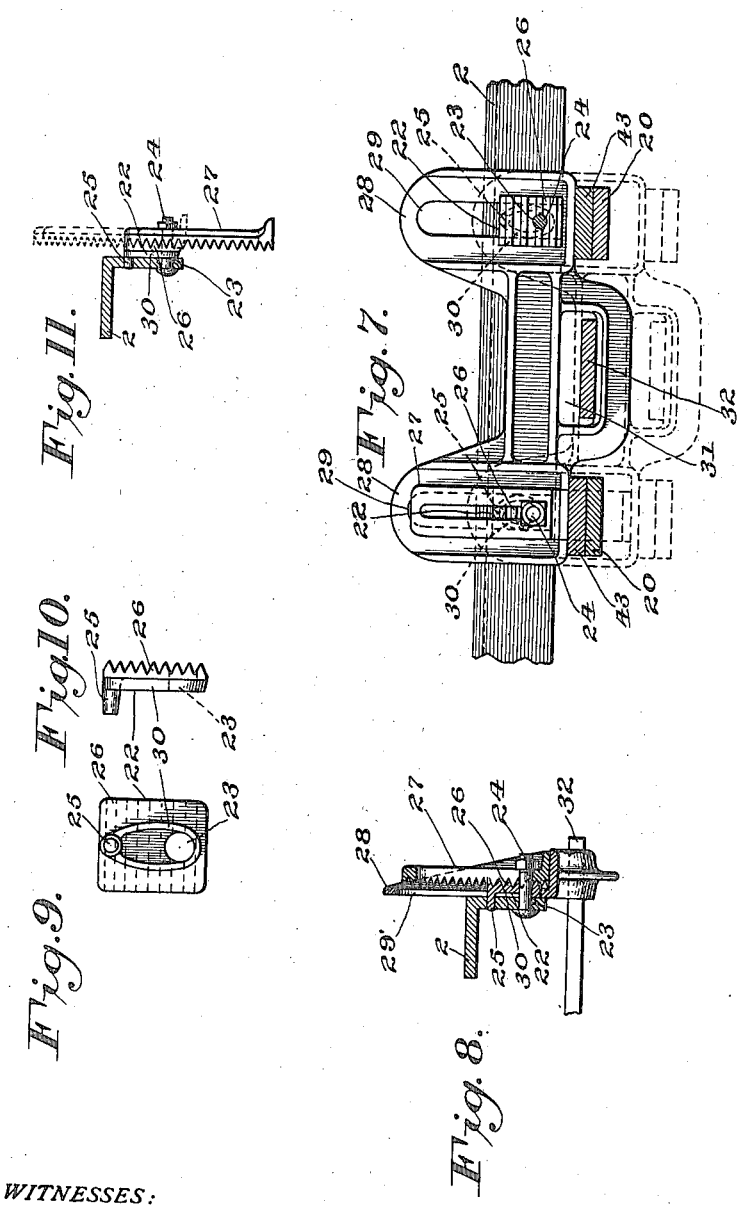

UNITED STATES PATENT OFFICE.

CHARLES S. SHARP, OF AUBURN, NEW YORK, ASSIGNOR TO INTERNATIONAL HARVESTER COMPANY OF NEW JERSEY, A CORPORATION OF NEW JERSEY.

DISK HARROW.

1,221,230.　　　　　Specification of Letters Patent.　　Patented Apr. 3, 1917.

Application filed August 1, 1912.　Serial No. 712,630.

*To all whom it may concern:*

Be it known that I, CHARLES S. SHARP, a citizen of the United States, residing at Auburn, in the county of Cayuga and State of New York, have invented certain new and useful Improvements in Disk Harrows, of which the following is a specification.

My invention relates to disk harrows having pivoted gangs that may be operated at varying angles relative to the line of draft by being turned about a vertical axis connecting the gang frames with the draft frame, the gang frames being also permitted to turn about horizontal axes arranged in a fore and aft direction, and consists in means for applying spring pressure between the draft frame and the inner ends of the gangs, and means for adjustably controlling a rising and falling movement of the inner ends of the gang frames relative to the draft frame; the object of my invention being to provide a construction simple in its parts, durable and efficient in operation. I attain these objects by means of mechanism, one embodiment of which is illustrated in the accompanying drawings, in which—

Figure 1 represents a top plan view of a disk harrow having my invention forming a part thereof;

Fig. 2 is a rear elevation of Fig. 1 on an enlarged scale;

Fig. 3 is an end elevation of a harrow, partly in section, and designed to illustrate the operation of the invention;

Fig. 4 is a detached sectional elevation of part of the structure designed only to illustrate the construction and operation of the spring pressure mechanism;

Fig. 5 is a rear elevation of Fig. 4;

Fig. 6 is a detached detail of the structure designed to illustrate the manner of mounting the spring pressure bar upon the draft frame;

Fig. 7 is a portion of the draft frame of a harrow and designed to illustrate a part of the pressure mechanism;

Fig. 8 is an end elevation of Fig. 7, partly in section;

Fig. 9 is a plan view of one of the parts of the pressure controlling mechanism;

Fig. 10 is a side elevation of Fig. 9; and

Fig. 11 is a detached detail of the pressure mechanism, designed to illustrate the manner of mounting the adjustable stop members.

The same reference characters designate like parts throughout the several views.

The draft frame of the machine includes a U-shaped member 1, having a transverse frame member 2 secured to the rear ends of the side members thereof, and 3 represents longitudinally arranged bars spaced apart and having the rear ends thereof secured to the middle portion of the frame member 2, and the front ends to the middle portion of the U-shaped member 1, and extending in front thereof for the purpose of receiving a draft tongue or other draft devices.

The gang frames include head members 4 having depending standards 5 secured thereto, the lower ends of the standards being secured to bearing boxes 6, in which are journaled the gang axles 7, including spacing spool members 8 and disks 9 of a common form mounted thereon. The gang frames are connected with the draft frame by means of vertically arranged bars 10, having forwardly turned portions 11 at their lower ends disposed in a horizontal plane and received by openings in ear members 12 integral with the outside bearing box 6 in a manner permitting the gang frame to turn about the axes thereof. The upper ends of the bars 10 are journaled in vertically arranged sleeve members 13 integral with bracket members 14 that are secured to opposite ends of the transverse member 2 of the draft frame in a manner permitting the gang frames to turn about the vertical axes of the bars 10 and at varying angles relative to the line of draft.

15 represents draft links having the front ends thereof pivotally connected with the side members of the draft frame and inclining downward and rearward. These links are provided with hook members 16 at the opposite ends thereof whereby the same are flexibly connected with the outside bearing box 6. 17 represents hand levers pivotally mounted upon the draft frame members 3 and having a common form of spring-pressed sliding detent mechanism mounted thereon and adapted to engage with notched sectors 18 secured to the frame members 3 and arranged concentric to the axes of the levers, the lower ends of the hand levers being connected, by means of links 19, with the inside bearing box 6 of the oppositely disposed gang frames, and by means of bars 20 with the inner ends of the head members 4 of the gang frames in a manner permitting the operator to control the angle of the disk gangs relative to the line of draft. 21 represents supplemental draft links having the front ends thereof pivotally connected with the side members of the draft frame and their rear ends with the head members 4 of the gang frames. 22 represents guide blocks having openings 23 at the lower ends thereof that receive securing bolts 24 that are received by openings through the lower portion of the vertical web of the frame member 2, and pintle members 25 at the upper ends thereof that are received by openings in the upper portions of said vertical web, the guide blocks having rectangular portions 26 that are corrugated transversely in a manner to receive stop members 27 that are corrugated in a like manner, and permitting the stop members to be adjusted vertically and be secured in any desired position of adjustment by means of the securing bolts 24. 28 represents a vertical sliding pressure member or bracket having vertically arranged slots 29 at opposite ends thereof that receive the oval shaped boss members 30 that form part of the guide blocks 22 in a manner permitting the pressure member 28 to move freely thereon. Member 28 is also provided with a horizontally arranged slot 31 that loosely receives the rear end of a pressure lever 32 that is pivotally connected intermediate the ends thereof with the lower end of a U-shaped bracket member 33 by means of a clip member 34 secured to the lever, and a pivot pin 35 connecting the clip with the U-shaped member, the U-shaped member being secured to the draft frame bars 3. 36 represents a pressure controlling hand lever pivotally connected with a bracket member 37 secured to the draft frame, and 38 represents a link having the upper end thereof pivotally connected with the hand lever 36 and the body portion thereof slidably received by an opening in the opposite end of the pressure lever 32. 39 represents a compression spring encircling the lower end of link 38 and operative between an adjusting nut 40 and the lever 32 in a manner to yieldingly turn said lever about the axis thereof in a direction to cause the rear end thereof to press downward upon the pressure member 28. 41 represents a toothed plate secured to one of the draft frame members 3, and 42 a foot controlled dog pivotally connected with the hand lever 36, preferably coaxially with the link 38, having the lower end thereof adapted to engage with the toothed plate 41, and the upper end turned laterally, whereby the operator may control the position of the lever. The bars 20 extend in rear of the pivotal connection thereof with the head members 4 of the gang frames and are provided with reinforcement members 43 that slidably engage with the member 28 when the gang frames are adjusted angularly and contact therewith in a manner to limit an upward movement of the inner ends of the disk gangs about the horizontal axes thereof, the stop members 27 being adjustable upon the draft frame in a manner permitting more or less vertical movement of the sliding member 28 and of the inner ends of the disk gangs. The force of the spring 39 is operative through the lever 32 and the sliding pressure member 28 to yieldingly force the inner disks of the gangs into the soil, and the gangs may be held in substantially a rigid position by means of the member 28 and the adjustable stop 27 which coöperate therewith and act to limit the upward movement of the same.

It is to be noted that in this construction the gangs are normally under the pressure of the spring 39, which acts through the member 32 and the pressure member 28. It is also to be noted that the pressure may be varied at any time by adjustment of the lever 36 and that the upward limit of movement of the pressure member may be regulated as desired by simply adjusting the stops 27, the pressure member always being freely slidable along the boss members 30 on the blocks 22 within the limits established by the stops 27 and the slots 29 formed in the pressure member. As pointed out above, the vertical movement of the gang frames may also be entirely eliminated by adjusting the stops 27 to such a position that the member 28 may not move upward.

While I have in this application specifically described one embodiment which my invention may assume in practice, it is, of course, to be understood that the same may be embodied in other forms and that the form shown herein may be modified without departing from the spirit of the invention.

What I claim as being my invention, and desire to secure by Letters Patent, is:

1. In a harrow, a frame, gang frames pivotally mounted on said frame, a yieldably mounted vertically movable bracket carried on said frame and engageable with the adjacent ends of said gang frames, adjustable means for limiting the vertical movement of said bracket, and means operable from said frame for regulating pressure on the yieldably mounted bracket.

2. In a harrow, a frame, gang frames pivotally mounted on said frame, a vertically slidable bracket carried on said frame and engageable with the adjacent ends of said gang frames, adjustable means for limiting the vertical movement of said bracket, and spring pressed means normally holding said bracket in engagement with said gang frames adjustable from said frame.

3. In a harrow, a frame, gang frames pivotally mounted on said frame, a vertically movable bracket engageable with the adjacent ends of said gang frames, adjustable means for limiting the vertical movement of said bracket, a lever pivoted on said frame having one end engaging said bracket, and operative connections on said frame resiliently connected to the opposite end of said lever.

4. In a harrow, a frame, gang frames pivotally mounted thereon, a bracket slidably mounted on said frame having abutments thereon engageable with adjacent ends of said gang frames, adjustable stops on said frame for limiting the movement of said bracket, a horizontally disposed lever pivoted on said main frame intermediate its ends having one end engaging said bracket, a vertically disposed spring-pressed rod extending through the opposite end of said lever, and adjustable lever connections carried on said frame and operatively connected to the upper end of said rod.

5. In a harrow, a frame having a plurality of openings therein, a guide block having an opening therein registering with one of said openings and a lug thereon protruding through the other of said openings, said guide block having a roughened outer face, a slotted stop member having a roughened face engageable with the roughened face of said block and adjustable with respect thereto, a slotted bracket member movable longitudinally of said block and engageable with said stop, and a bolt extending through the registering openings in said frame and block and the slots in said stop and bracket clamping said stop to said block and said block to said frame.

6. In a harrow, a frame, spaced blocks carried thereon having corrugated outer faces, stops having coöperating corrugated faces engaging with the faces on said blocks, said stops being adjustable longitudinally of said blocks, a vertically slidable pressure member having upstanding slotted portions disposed between said blocks and said frame, said member having portions engageable with said stops to limit its upward movement, bolts clamping said stops and blocks to said frame, and means carried on said frame for regulating pressure upon said pressure member.

7. A disk harrow including, in combination, a draft frame, disk gangs including gang frames pivotally connected with said draft frame in a manner permitting a turning movement thereof about vertical and horizontal axes, a pressure member slidably mounted upon said draft frame and engaging with the inner ends of said gang frames, and a spring-pressed lever pivotally mounted upon said draft frame and engaging with said slidable pressure member.

8. A disk harrow including, in combination, a draft frame, disk gangs including gang frames connected with said draft frame in a manner permitting a turning movement thereof about vertical and horizontal axes, a pressure member slidably mounted upon said draft frame and engaging with the inner ends of said gang frames, a pressure lever pivotally mounted intermediate the ends thereof upon said draft frame and having one end thereof engaging with said slidable pressure member, a hand lever pivotally mounted upon said draft frame, a link having one end thereof pivotally connected with said hand lever and the body portion thereof slidably received by an opening in the opposite end of said pressure lever, a compression spring carried by the opposite end of said link and operatively engaging with said pressure lever, and means for securing said hand lever in various positions of adjustment.

9. A disk harrow including, in combination, a draft frame, disk gangs including gang frames connected with said draft frame in a manner permitting a turning movement thereof about vertical and horizontal axes, a pressure member slidably mounted upon said draft frame and engaging with the inner ends of said gang frames, a spring-pressed lever pivotally mounted upon said draft frame and engaging with said slidable pressure member, and adjustable stop members carried by said draft frame and adapted to engage with said pressure member in a manner to limit an upward movement of said gang frames.

10. A disk harrow including, in combination, a draft frame including a transversely arranged bar, disk gangs including gang frames connected with said transverse bar in a manner permitting a turning movement thereof about vertical and horizontal axes, a pressure member slidably mounted upon said transverse bar and having opposite ends thereof engaging with the inner ends of said gang frames, said pressure member having a horizontally arranged slot therein intermediate opposite ends thereof, a pressure lever pivotally mounted upon said draft frame and having one end thereof received by the slotted opening in said slidable member, a hand lever pivotally mounted upon said draft frame, a link connection between said hand lever and the opposite end of said pressure lever, a spring carried by said link and operative to yieldingly rock said pressure lever in a direction to cause said slidable pressure member to engage with said gang frames, and adjustable stops carried by said transverse bar and adapted to engage with said pressure member in a manner to limit an upward movement of said gang frames.

11. A disk harrow including, in combination, a draft frame including a transversely arranged bar, disk gangs including gang frames connected with said transverse bar in a manner permitting a turning movement thereof about vertical and horizontal axes, guide blocks secured to said transverse bar, a slidable pressure member having vertically arranged slots at opposite ends thereof loosely receiving said guide blocks, said pressure member engaging with the inner adjacent ends of said gang frames and provided with a horizontally arranged slot intermediate the ends thereof, a spring-pressed lever pivotally mounted upon said draft frame and having one end thereof received by the intermediate slot in said slidable pressure member, means for regulating the pressure of said lever, and stop members adjustably secured to said guide blocks and operative to limit an upward swinging movement of the inner adjacent ends of said gang frames.

12. A disk harrow including, in combination, a draft frame including a transversely arranged bar, disk gangs including gang frames connected with said transverse bar in a manner permitting a turning movement thereof about vertical and horizontal axes, said gang frames including transversely arranged head members, gang axles journaled in inner and outside bearings carried by said gang frames below said head members, draft links connecting said draft frame with the outside bearings carried by said gang frames, a hand lever mounted upon said draft frame, gang adjusting link connections between said hand lever and the inside adjacent bearings carried by said gang frames, gang adjusting bars having the front ends thereof connected with said hand lever and the rear ends thereof pivotally connected with the inner adjacent ends of said transversely arranged head members and extended rearward therefrom, guide blocks secured to the transverse bar of said draft frame, a slidable pressure member having vertically arranged slots at opposite ends thereof loosely receiving said guide blocks, said slidable pressure member engaging with said gang adjusting bars and provided with a horizontally arranged slot intermediate the ends thereof, a spring-pressed lever pivotally mounted upon said draft frame and having one end thereof received by the intermediate slot in said slidable pressure member, means for regulating the pressure of said lever, and stop members adjustably secured to said guide blocks and adapted to engage with said pressure member in a manner to limit an upward movement of the inner ends of said gang frames.

CHARLES S. SHARP.

Witnesses:
K. T. ELLIOTT,
HUGH S. WYLLIE.